Feb. 6, 1934.  M. H. WINSTEAD  1,945,763
PISTON RING
Filed March 20, 1933
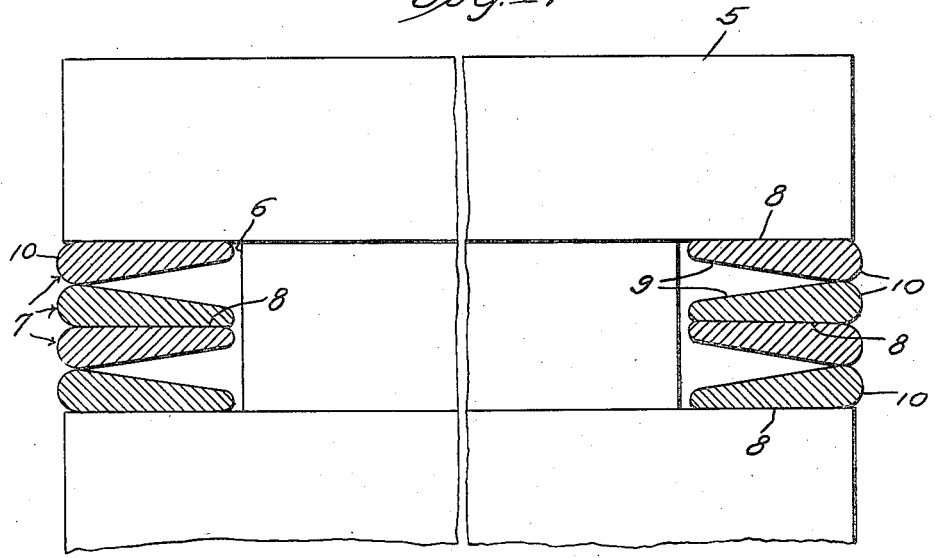
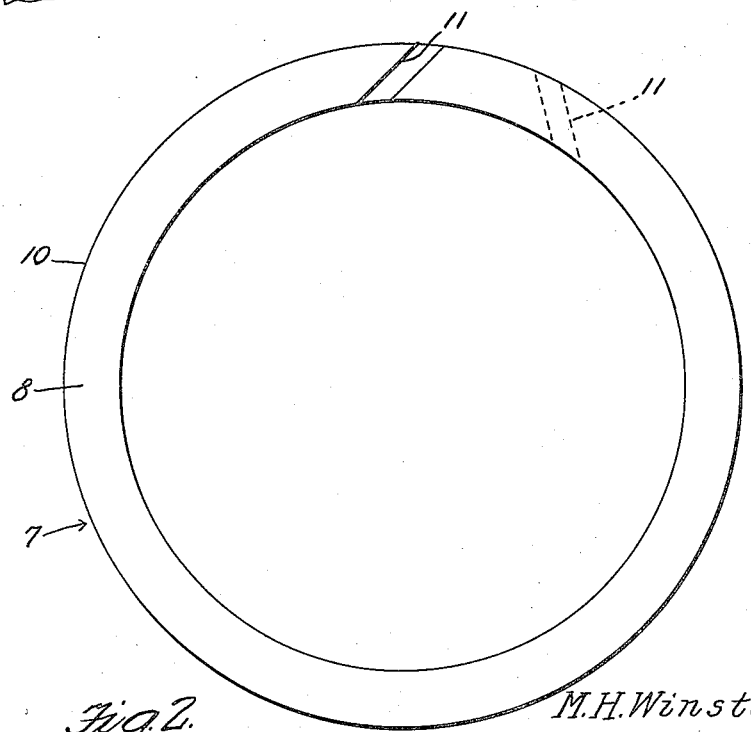
Inventor
M. H. Winstead,
By Clarence A. O'Brien
Attorney Patented Feb. 6, 1934

1,945,763

UNITED STATES PATENT OFFICE 1,945,763

PISTON RING

Martin H. Winstead, Lexington, Nebr.

Application March 20, 1933. Serial No. 661,846

1 Claim. (Cl. 309—29)

This invention relates to piston rings, and particularly to piston rings of a type adapted to be used in internal combustion engines.

In accordance with the present invention a piston ring is provided which will prevent the leakage of oil around and behind the ring, will not scratch or scar the cylinder wall and will provide for quick sealing even when used in old cylinders in need of reboring.

The invention together with its numerous objects and advantages will be best understood from a study of the following description taken in connection with the accompanying drawing wherein:

Figure 1 is a sectional elevational view showing the use of piston rings embodying the features of the present invention.

Figure 2 is a top plan view of the piston ring assembly shown in Figure 1.

In the drawing 5 designates generally a portion of a piston of well known construction provided with a ring receiving groove 6. In accordance with the present invention there are arranged in the groove 6 four piston rings 7 identical in construction and design embodying the features of the present invention.

In accordance with the present invention the ring 7 is formed of steel and is tapered transversely, being provided as clearly shown in the drawing on one side with a flat face 8 and on a relatively opposite side with an inclined or beveled face 9. The ring tapers radially inwardly so that its thinnest portion is at the inner circular edge of the ring and its thickest portion adjacent to the outer circular edge of the ring. At said outer circular edge the ring is rounded off or is convex as at 10 thereby providing for the piston ring a bearing surface for contact with the wall of the cylinder that upon expansion of the ring under heat will not bind against the wall nor score or scratch the wall, and at the same time insure sealing engagement with the wall of the cylinder even though the cylinder be greatly in need of reboring.

The rings 7 are also of the split type for expansion purposes, each ring as clearly shown in Figure 2 being provided with a miter cut 11, and when the rings are properly arranged within the groove 6 each successive ring seals the miter cut of the next adjacent ring.

In actual practice the rings are arranged within the groove as shown in Figure 1, that is to say, with the upper and lowermost rings having their flat sides or faces 8 engaging the walls of the groove while the intermediate rings have their flat faces engaging one another, and their beveled faces 9 confronting the beveled faces 9 of the said upper and lower rings; and of course with the rings so annularly related as to insure maintaining the miter cuts 11 of the rings out of alinement.

By having the rings of this construction, and arranged in this manner, tension will be at all times maintained against the upper and lowermost rings for urging them into contact with the top and bottom walls of the groove 6 and the tension on all the rings will serve to positively prevent oil from escaping into the groove behind the rings.

The above will be best understood when it is considered that each piston ring, in accordance with the present invention, is made from a reticular spring steel wire rolled to shape so that the thinnest part of the wire is at the inside of the ring. In rolling the ring one side is straight and the other is tapered from the outer to the inner side. Normally the ring is expanded, that is to say the gap in the ring is open; and consequently when the ring is compressed for putting the same into the cylinder the inner or thin side will cup up or down, dependent upon whether the straight or the inclined side of the ring is facing upwardly or downwardly, putting a spring tension on the ring groove wall; this cup effect coming, as is thought apparent at any time a piece of strap or flat steel is bent edgeways.

Further by having the rings thicker at their outer circumferential edges suitable compensation is made for the expansive action of the rings under heat, it being noted that the thicker sides of the ring will expand under heat more than will the thinner portions of the ring with the result that the pressure of the rings against the cylinder wall will be greater when the motor is cold than when it is warmed up. By reason of this fact heating and wearing of the ring will be reduced to a minimum and the likelihood of the pistons and rings sticking or the scoring or the scarring of the cylinder wall being almost entirely overcome.

As will be understood each ring will cup about three thousandth of an inch, and that each ring, at its outer periphery is caused to expand to a greater extent than the inner periphery will be clear when it is considered that in actual practice there will be more heat on the outside of the ring because of the friction on the cylinder wall while on the inside of the ring there is a film of oil, the thin edge or inside edge of the ring acting as a fin for cooling the ring. Such is substantially the same result as is accomplished by taking a straight piece of reticular wire before it is shaped into a ring and heating it. Because of the shape of the wire and the heating thereof the wire will curve toward its thin edge; and thus the ring, in accordance with the present invention when heated as above explained will, upon a heating thereof tend to cup sufficiently for exerting the tension hereinbefore referred to.

Even though I have herein shown and described the preferred embodiment of the invention, it is to be understood that the same is susceptible of further changes, modifications and improvements coming within the scope of the appended claim.

Having thus described my invention, what I claim as new is:

In combination with a piston ring having a circumferential packing groove, a packing arranged within the grove and including a plurality of superimposed split, annular, expansible resilient ring members, each of said ring members being substantially wedge shaped in cross section, the outer edge of each of said ring members being of greater axial width than its inner edge.

MARTIN H. WINSTEAD.